United States Patent
Murayama

(10) Patent No.: US 8,094,354 B2
(45) Date of Patent: Jan. 10, 2012

(54) SCANNING OBJECTIVE LENS, SCANNING PROBE AND SCANNING ENDOSCOPE

(75) Inventor: Minoru Murayama, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/840,510

(22) Filed: Jul. 21, 2010

(65) Prior Publication Data
US 2011/0019255 A1 Jan. 27, 2011

(30) Foreign Application Priority Data
Jul. 23, 2009 (JP) ................................. 2009-172433

(51) Int. Cl.
*G02B 26/08* (2006.01)

(52) U.S. Cl. .................. 359/209.1; 359/205.1; 359/794; 600/160; 600/167

(58) Field of Classification Search .................. 359/362, 359/368, 656, 661, 717, 794, 798; 600/160, 600/166, 167, 178, 478; 385/117–119, 33, 385/35

See application file for complete search history.

(56) References Cited

U.S. PATENT DOCUMENTS

| | | | |
|---|---|---|---|
| 6,856,712 B2 | 2/2005 | Fauver et al. | |
| 6,954,222 B2 | 10/2005 | Iizuka et al. | |
| 6,975,898 B2 | 12/2005 | Seibel | |
| 7,023,596 B2 | 4/2006 | Koreeda | |
| 7,193,759 B2 | 3/2007 | Takeuchi et al. | |
| 7,283,288 B2 | 10/2007 | Matsuoka | |
| 7,338,439 B2 | 3/2008 | Kanai | |
| 7,433,109 B2 | 10/2008 | Yamagata | |
| 7,530,948 B2 * | 5/2009 | Seibel et al. | 600/178 |
| 2004/0254474 A1 * | 12/2004 | Seibel et al. | 600/473 |
| 2007/0091405 A1 | 4/2007 | Matsuoka | |
| 2008/0051636 A1 * | 2/2008 | Murayama | 600/176 |
| 2010/0091388 A1 * | 4/2010 | Takato | 359/794 |
| 2010/0121146 A1 | 5/2010 | Sugimoto | |

FOREIGN PATENT DOCUMENTS

JP 2003-535659 12/2003

* cited by examiner

*Primary Examiner* — James Phan
(74) *Attorney, Agent, or Firm* — Greenblum & Bernstein P.L.C.

(57) ABSTRACT

A scanning objective lens for scanning on an observation target with light emitted from an exit end face of an optical fiber moving on a curved plane formed to be convex on an objective lens side, including first and second lens groups each having a positive power, wherein the first lens group and the second lens group are arranged in this order from the optical fiber's exit end face side, and the scanning objective lens satisfies conditions:

$$0.60 < f1/f2 < 1.25 \quad (1); \text{ and}$$

$$0.95 < |R1a/R1b| < 2.50 \quad (2)$$

when f1 denotes a focal length of the first lens group, f2 denotes a focal length of the second lens group, R1a denotes a curvature radius in the first lens group nearest to the exit end face of the optical fiber, and R1b denotes a curvature radius of a lens surface in the first lens group nearest to the observation target.

8 Claims, 12 Drawing Sheets

FIG.6A  FIG.6B  FIG.6C  FIG.6D
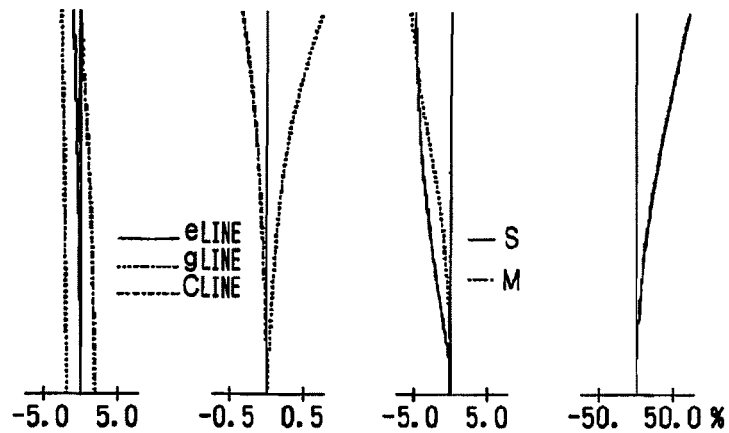
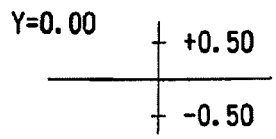
FIG.7A
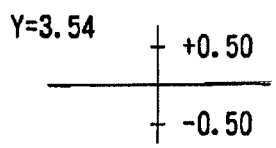
FIG.7B
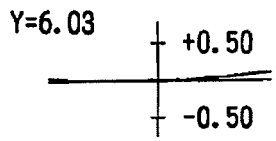
FIG.7C
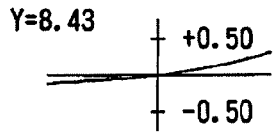
FIG.7D
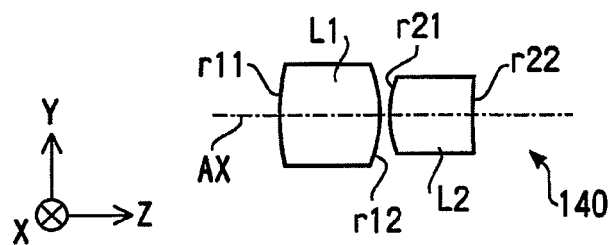
FIG. 8

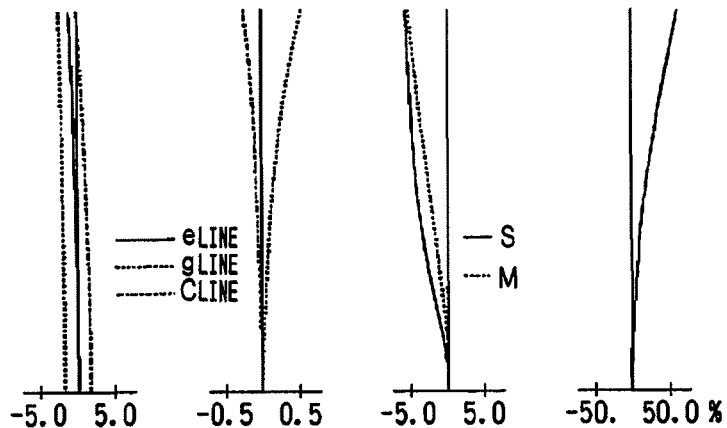
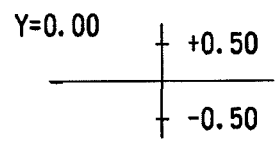
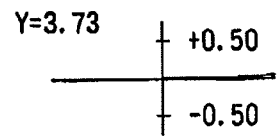
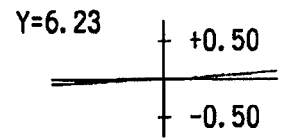
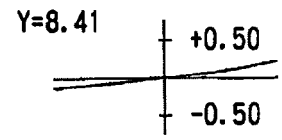
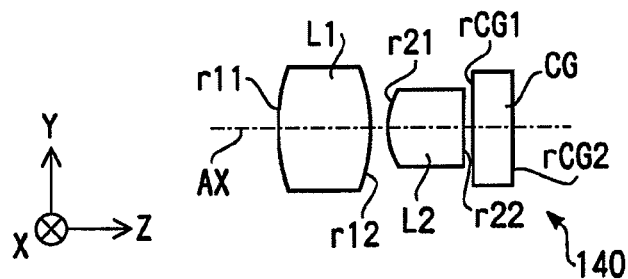
FIG. 11

FIG.12A FIG.12B FIG.12C FIG.12D
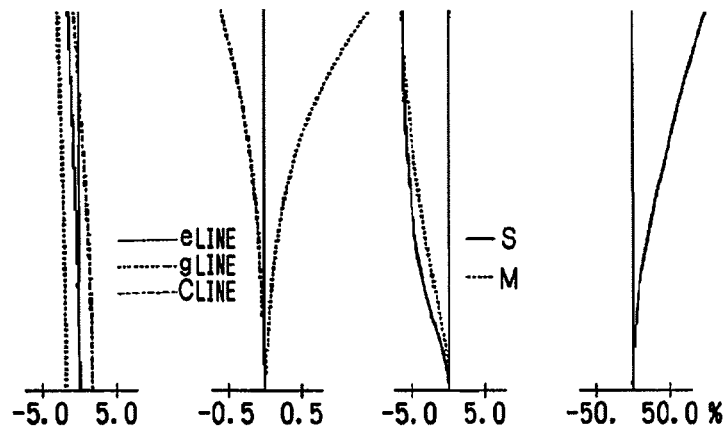
FIG.13A
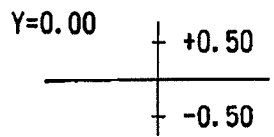
FIG.13B
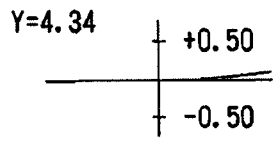
FIG.13C
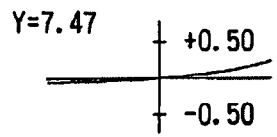
FIG.13D
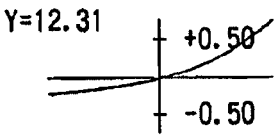
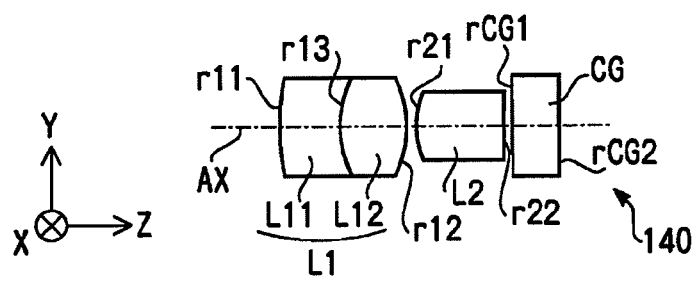
FIG.14

FIG.15A FIG.15B FIG.15C FIG.15D
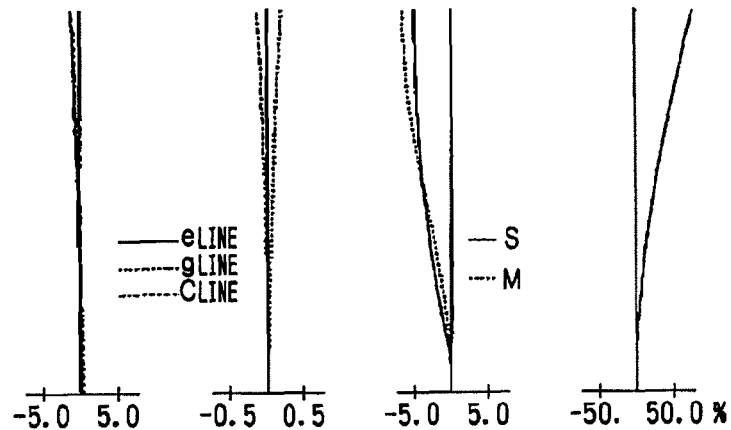
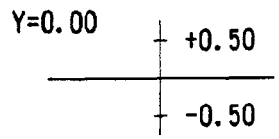
FIG.16A
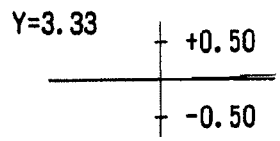
FIG.16B
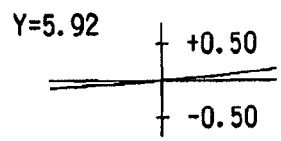
FIG.16C
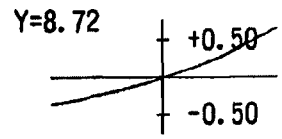
FIG.16D
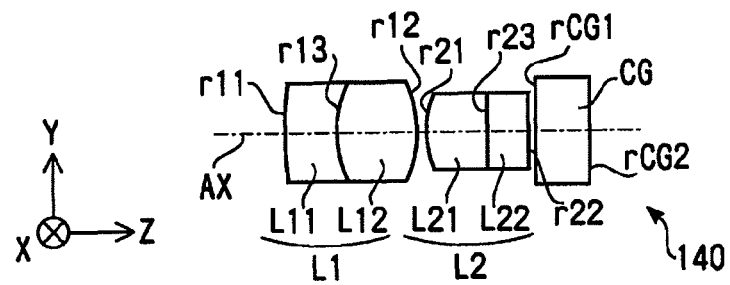
FIG.17

FIG.18A FIG.18B FIG.18C FIG.18D
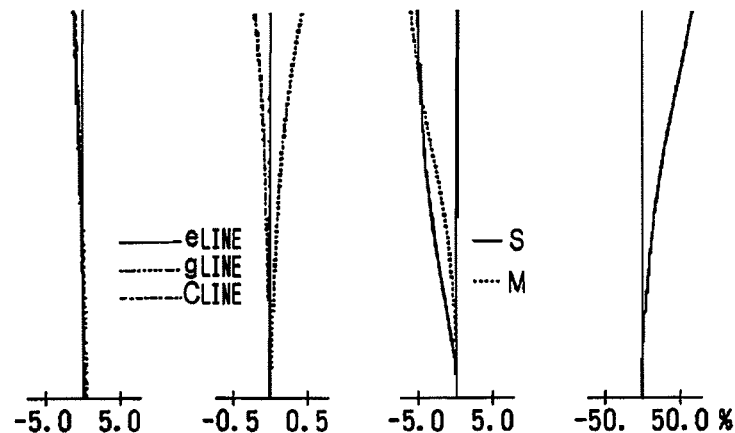

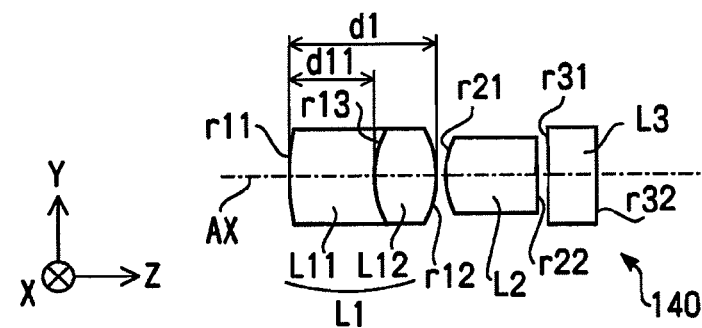
FIG.20

FIG.21A FIG.21B FIG.21C FIG.21D
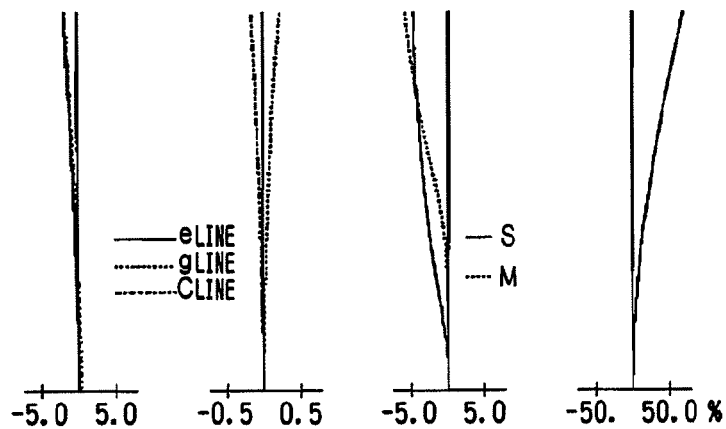
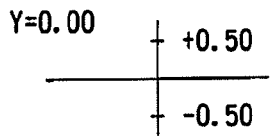
FIG.22A
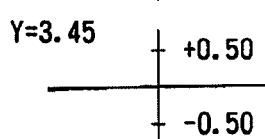
FIG.22B
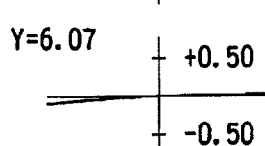
FIG.22C
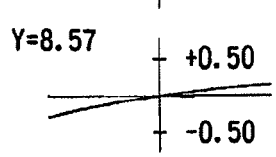
FIG.22D
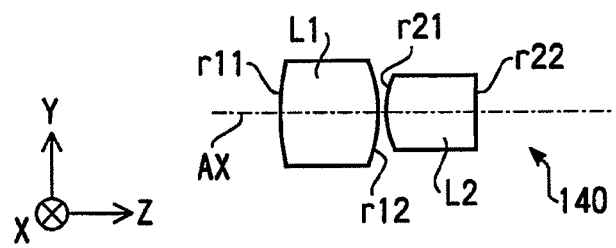
FIG.23

FIG.24A FIG.24B FIG.24C FIG.24D
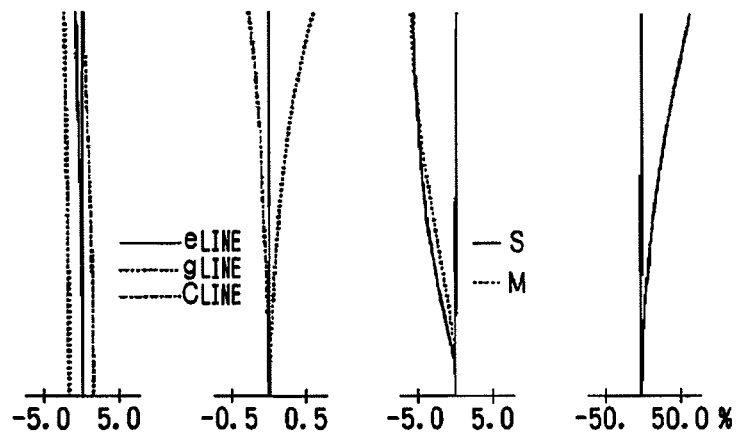
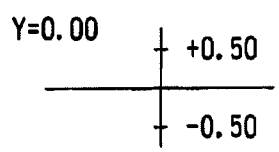
FIG.25A
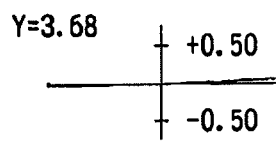
FIG.25B
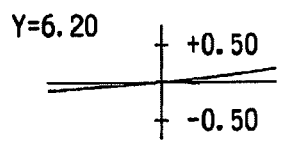
FIG.25C
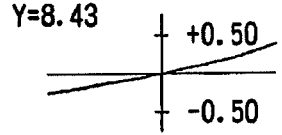
FIG.25D
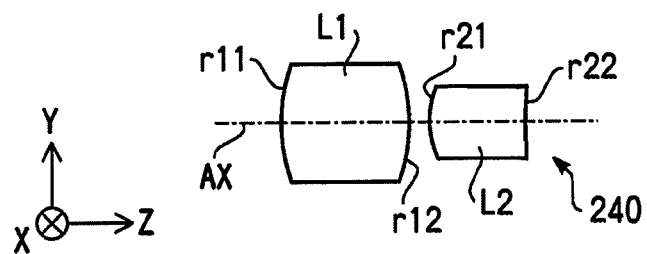
FIG.26

FIG.27A FIG.27B FIG.27C FIG.27D
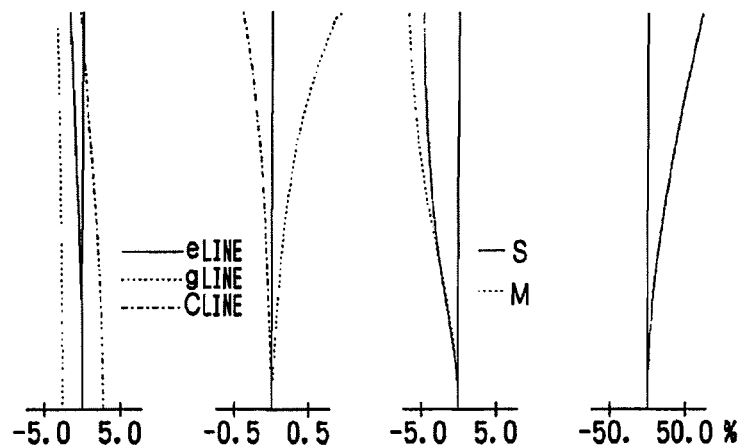
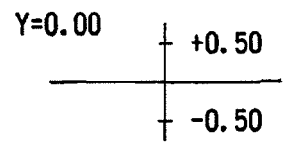
FIG.28A
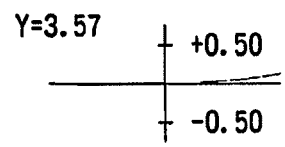
FIG.28B
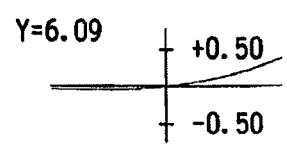
FIG.28C
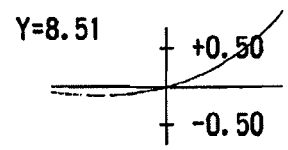
FIG.28D
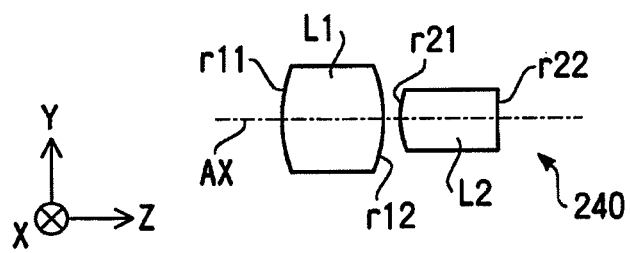
FIG.29

FIG.30A FIG.30B FIG.30C FIG.30D
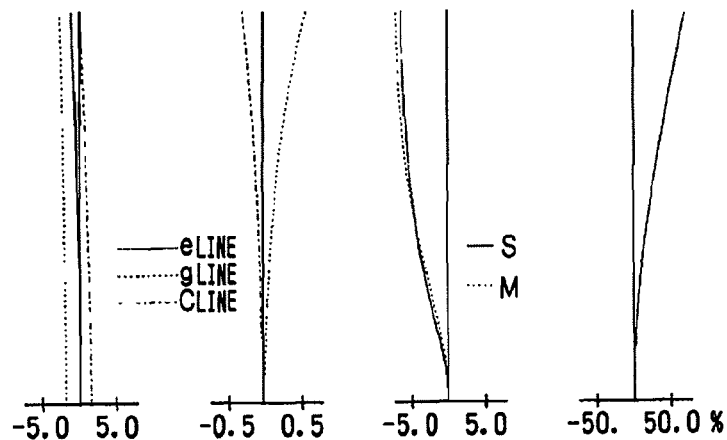

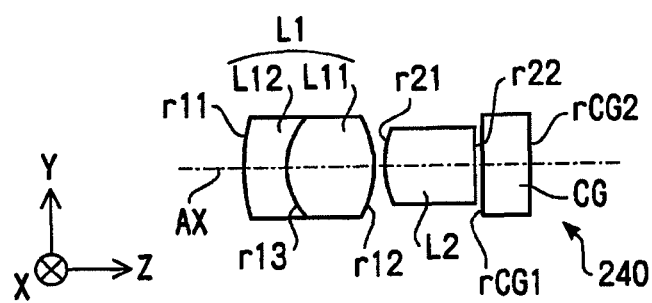
FIG.32

SCANNING OBJECTIVE LENS, SCANNING PROBE AND SCANNING ENDOSCOPE

BACKGROUND OF THE INVENTION

The present invention relates to a scanning probe and a scanning endoscope configured to scan on a target with light by causing a tip of an ultrathin optical fiber to oscillate to obtain image information of the target, and to an objective lens suitable for such a scanning probe and a scanning endoscope.

Electronic-scopes have been used by doctors as medical apparatuses for diagnosis on a body cavity of a patient. A tip part of an electronic-scope of this type is configured to be compact in size so that an insertion unit of the electronic-scope can be smoothly inserted into the body cavity of the patient. At the tip part of the electronic-scope, various types of components are installed. In practical, the design minimum outer diameter of the tip part of the electronic-scope is defined by components having larger sizes in the tip part (e.g., a solid state imaging device). Therefore, in order to thin the tip part of the electronic-scope, it is desirable to employ a further downsized solid state imaging device. However, in general as the size of a solid state imaging device decreases, the performance of the solid state imaging device, such as a resolution, a dynamic range, and an SN ratio, deteriorates. Therefore, even if the tip part of the electronic-scope is thinned, it is not appropriate to employ such a downsized solid state imaging device without careful consideration.

A scanning probe configured to be thinner than a conventional electronic-scope (i.e., an electronic-scope employing a solid state imaging device) by employing a configuration not requiring use of a solid state imaging device has been proposed. A medical observation system having a scanning probe of this type is disclosed for example in U.S. Pat. No. 6,856,712 (hereafter, referred to as U.S. Pat. No. 6,856,712). The scanning probe disclosed in U.S. Pat. No. 6,856,712 is configured to scan on a target with scanning light produced by causing a tip of a single optical fiber to oscillate so that the target is scanned with a predetermined scanning pattern. The scanning probe detects reflected light from the target and executes photoelectric conversion to output sequentially a converted signal to a video processor. The video processor processes the received signal to display an image of the target on a monitor. A doctor is able to conduct diagnosis and treatment while observing the image of the target on the monitor.

SUMMARY OF THE INVENTION

The scanning probe disclosed in U.S. Pat. No. 6,856,712 includes a scanning objective lens (a microlens) at an exit end face of an optical fiber. In the scanning probe, an exit end face of the optical fiber (i.e., a light source) moves in contrast to the configuration of a conventional electronic-scope. Therefore, if the scanning objective lens for the scanning probe is designed by a technical concept for an objective lens for a conventional electronic-scope, different types of problems which would not arise in a conventional electronic-scope may arise. For example, when the exit end face of the optical fiber (i.e., the light source) moves, a hypothetical plane drawn by a moving track of the exit face of the optical fiber is not a flat plane but is a curved surface which is convex with respect to the objective lens. Therefore, the curvature of field may become extremely large. However, in U.S. Pat. No. 6,856,712, such problems are not discussed and a concrete configuration of the scanning objective lens is not shown.

The present invention is advantageous in that it provides a scanning probe and a scanning endoscope suitably configured to be able to obtain a suitable image, and a scanning objective lens to be installed in such a scanning probe and a scanning endoscope.

According to an aspect of the invention, there is provided a scanning objective lens for scanning on an observation target with light emitted from an exit end face of an optical fiber moving on a curved plane formed to be convex on an objective lens side. The scanning objective lens includes a first lens group having a positive power; and a second lens group having a positive power. In this configuration, the first lens group and the second lens group being arranged in this order from the optical fiber's exit end face side, and the scanning objective lens satisfying conditions:

$$0.60 < f1/f2 < 1.25 \qquad (1); \text{ and}$$

$$0.95 < |R1a/R1b| < 2.50 \qquad (2)$$

where f1 (unit: mm) denotes a focal length of the first lens group, f2 (unit: mm) denotes a focal length of the second lens group, R1a (unit: mm) denotes a curvature radius of a lens surface of lens surfaces in the first lens group nearest to the exit end face of the optical fiber, and R1b (unit: mm) denotes a curvature radius of a lens surface of the lens surfaces in the first lens group nearest to the observation target.

With this configuration, a scanning objective lens configured to have suitable optical performance while achieving a compact size and a wide angle of view can be provided.

When f1/f2 of the condition (1) gets larger than the upper limit of the condition (1), the power of the first lens group which refracts the light beam emerging from an exit end face of the optical fiber toward an optical axis becomes weak, and therefore it becomes necessary to design the scanning objective lens to have a large lens diameter. Furthermore, in this case it is necessary to assign a substantial power to the second lens group to secure the total positive power of the scanning objective lens. As a result, the curvature radius of a lens surface which is a lens surface of the second lens group located on a side of the exit end face of the optical fiber and has the strongest positive power in the second lens group becomes small. This means that the Petzval value becomes larger at the lens surface on the side of the exit end face of the optical fiber, and therefore the curvature of field becomes large. When f1/f2 of the condition (1) gets smaller than the lower limit of the condition (1), the power of the first lens group becomes too strong, and therefore a coma and the astigmatism due to the first lens group occur largely.

When |R1a/R1b| gets larger than the upper limit of the condition (2), the astigmatism due to an observation target side lens surface of the first lens group becomes large, and the power of a lens surface located on the side of the exit end face of the optical fiber in the first lens group which refracts the light beam emerging from the exit end face of the optical fiber becomes weak. As a result, it becomes necessary to increase the diameter of the scanning objective lens. When |R1a/R1b| gets smaller than the lower limit of the condition (2), the power of the lens surface located on the side of the exit end face of the optical fiber in the first lens group becomes too strong, and therefore the coma due to the lens surface r becomes large.

In at least one aspect, a lens surface of lens surfaces in the second lens group nearest to the observation target may be a concave surface. In this case, the scanning objective lens may satisfy a condition:

$$1.25 < R2b/f < 4.80 \qquad (3)$$

where R2b (unit: mm) denotes a curvature radius of the concave surface, and f (unit: mm) denotes a total focal length of the scanning objective lens. With this configuration, the curvature of field caused largely due to curving of a hypothetical plane drawn by a moving track of the exit end face of the optical fiber (i.e., an object plane) can be further suitably corrected.

When R2b/f gets larger than the upper limit of the condition (3), the power of the observation target side surface of the second lens group is weak, and therefore the curvature of filed becomes an undercorrected condition. When R2b/f gets smaller than the lower limit of the condition (3), it becomes necessary to set the curvature radius of the lens surface located on the side of the exit end face of the optical fiber in the second lens group to be small so as to secure the positive power of the second lens group. As a result, the curvature of field due to the lens surface located on the side of the exit end face becomes large, and thereby the peripheral resolution deteriorates considerably. In addition, since the curvature radius of the lens surface on the side of the exit end face becomes small, it becomes impossible to secure a proper peripheral part thickness of the second lens group. If the peripheral part thickness of the second lens group becomes small, processing of the second lens group becomes difficult, which causes a considerable degree of disadvantage in a manufacturing process of the second lens group. In addition, in this case the power of the observation target side surface of the second lens group becomes to strong, and therefore the coma due to the observation target side surface of the second lens group becomes large.

In at least one aspect, the first lens group may be a cemented lens in which a first negative lens and a first positive lens arranged in this order from the optical fiber's exit end face side are cemented together. In this case, the scanning objective lens may satisfy conditions:

$$0.35 < d11/d1 < 0.60 \quad (4); \text{ and}$$

$$20 < v12 - v11 \quad (5)$$

where d1 (unit: mm) denotes a thickness of the first lens group on an optical axis, d11 (unit: mm) denotes a thickness of the first negative lens on the optical axis, v11 denotes Abbe number with respect to e-line of the first negative lens, and v12 denotes Abbe number with respect to e-line of the first positive lens. With this configuration, the chromatic aberration can be suitably corrected.

When d11/d1 gets larger than the upper limit of the condition (4), it becomes necessary to increase the curvature radius of a cementing surface to secure the peripheral part thickness of the first positive lens, and therefore the chromatic aberration becomes an undercorrected condition. When d11/d1 gets smaller than the lower limit of the condition (4), the diameter of the light beam on the cementing surface is small, and therefore it is impossible to suitably correct the axial chromatic aberration. When the condition (5) is not satisfied, the curvature radius of the cementing surface becomes small, and therefore it becomes difficult to secure the peripheral part thickness of the first positive lens. In addition, processing of the first positive lens becomes difficult, which causes a considerable degree of disadvantage in a manufacturing process of the first positive lens.

In at least one aspect, the second lens group may be a cemented lens configured such that a second positive lens and a second negative lens arranged in this order from the optical fiber's exit end face side are cemented together. In this case, the scanning objective lens may satisfy a condition:

$$v22 < 25 \quad (6)$$

where v22 denotes Abbe number of the second negative lens with respect to e-line. With this configuration, the curvature of field and the axial chromatic aberration can be more suitably corrected.

When the condition (6) is not satisfied, the axial chromatic aberration is brought to an undercorrected condition.

In at least one aspect, at least one of the first lens group and the second lens group may be a single lens.

In at least one aspect, the scanning objective lens further includes a third lens group arranged on a rear side of the second lens group. The third lens group has a negative power. With this configuration, further widening of the angle of view and more suitable correction of the aberrations can be achieved.

According to another aspect of the invention, there is provided a scanning probe or a scanning endoscope, which is provided with an optical fiber which transmits light emitted from a light source; an oscillating unit configured to cause the optical fiber to oscillate so that an exit end face of the optical fiber periodically moves along a predetermined track on a curved plane; one of the above described scanning objective lenses; and a light output unit configured to receive light reflected from the observation target.

With this configuration, a scanning probe or a scanning endoscope configured to have suitable optical performance while achieving a compact size and a wide angle of view can be provided.

BRIEF DESCRIPTION OF THE ACCOMPANYING DRAWINGS

FIGS. 6A-6D are graphs illustrating aberrations of the scanning objective lens according to the first example of the invention.

FIGS. 7A-7D are graphs illustrating lateral aberrations of the scanning objective lens according to the first example of the invention.

FIG. 8 is a side view illustrating a configuration of a scanning objective lens according to a second example of the invention.

FIGS. 9A-9D are graphs illustrating aberrations of the scanning objective lens according to the second example of the invention.

FIGS. 10A-10D are graphs illustrating lateral aberrations of the scanning objective lens according to the second example of the invention.

FIG. 11 is a side view illustrating a configuration of a scanning objective lens according to a third example of the invention.

FIGS. 12A-12D are graphs illustrating aberrations of the scanning objective lens according to the third example of the invention.

FIGS. 13A-13D are graphs illustrating lateral aberrations of the scanning objective lens according to the third example of the invention.

FIG. 14 is a side view illustrating a configuration of a scanning objective lens according to a fourth example of the invention.

FIGS. 15A-15D are graphs illustrating aberrations of the scanning objective lens according to the fourth example of the invention.

FIGS. 16A-16D are graphs illustrating lateral aberrations of the scanning objective lens according to the fourth example of the invention.

FIG. 17 is a side view illustrating a configuration of a scanning objective lens according to a variation of the embodiment (a fifth example) of the invention.

FIGS. 18A-18D are graphs illustrating aberrations of the scanning objective lens according to the fifth example of the invention.

FIG. 20 is a side view illustrating a configuration of a scanning objective lens according to a variation of the embodiment (a sixth example) of the invention.

FIGS. 21A-21D are graphs illustrating aberrations of the scanning objective lens according to the sixth example of the invention.

FIGS. 22A-22D are graphs illustrating lateral aberrations of the scanning objective lens according to the sixth example of the invention.

FIG. 23 is a side view illustrating a configuration of a scanning objective lens according to a seventh example of the invention.

FIGS. 24A-24D are graphs illustrating aberrations of the scanning objective lens according to the seventh example of the invention.

FIGS. 25A-25D are graphs illustrating lateral aberrations of the scanning objective lens according to the seventh example of the invention.

FIG. 26 is a side view illustrating a configuration of a scanning objective lens according to a comparative example 1 of the invention.

FIGS. 27A-27D are graphs illustrating aberrations of the scanning objective lens according to the comparative example 1 of the invention.

FIGS. 28A-28D are graphs illustrating lateral aberrations of the scanning objective lens according to the comparative example 1 of the invention.

FIG. 29 is a side view illustrating a configuration of a scanning objective lens according to a comparative example 2 of the invention.

FIGS. 30A-30D are graphs illustrating aberrations of the scanning objective lens according to the comparative example 2 of the invention.

FIG. 32 is a side view illustrating a configuration of a scanning objective lens according to a comparative example 3 of the invention.

DETAILED DESCRIPTION OF THE EMBODIMENTS

Hereinafter, an embodiment according to the invention is described with reference to the accompanying drawings.

Figure 1:
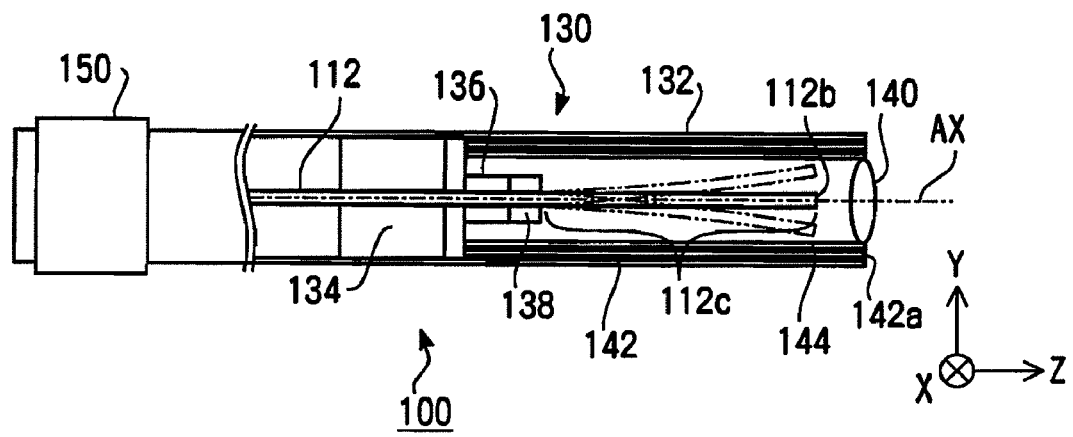
FIG. 1 is a side view illustrating generally a configuration of a scanning medical probe according to an embodiment of the invention.
Figure 2:
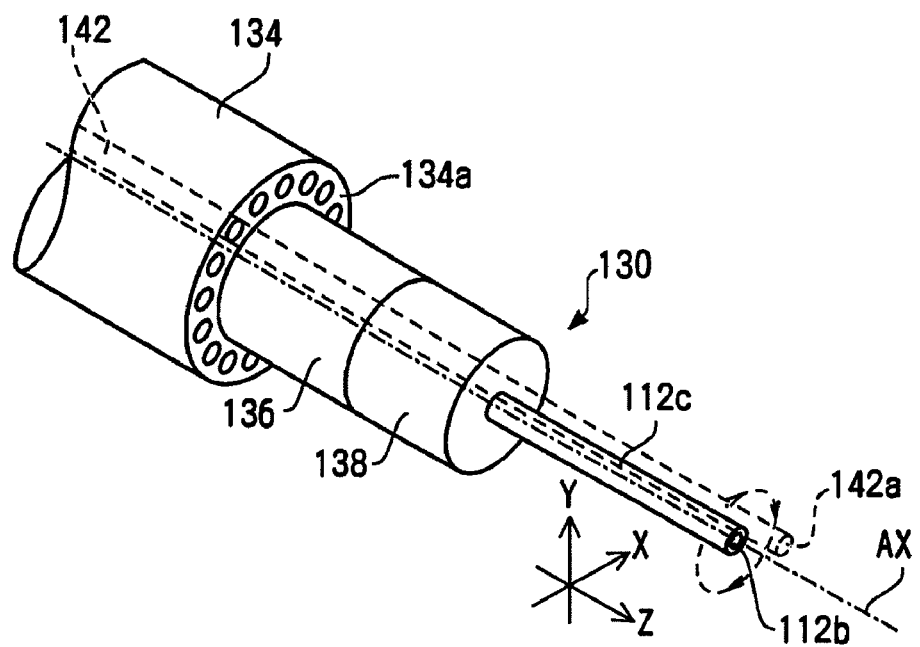
FIG. 2 is a perspective view illustrating an internal configuration of a tip part of the scanning medical probe according to the embodiment of the invention.

FIG. 1 is a side view illustrating generally a configuration of a scanning medical probe 100 according to the embodiment of the invention. In FIG. 1, an internal configuration only of a tip part 130 of the scanning medical probe 100 is illustrated for convenience of illustration. FIG. 2 is a perspective view generally illustrating an internal configuration of the tip part 130. In the following, the longitudinal direction of the scanning medical probe 100 is defined as z-direction, and directions which are orthogonal to the z-axis and are orthogonal to each other are defined X direction and Y direction. According to this definition, the internal configuration of the tip part 130 shown in FIG. 1 is a side cross section of the tip part 130 on the Y-Z plane including a center axis AX of the scanning medical probe 100.

As shown in FIG. 1, at a proximal end of the scanning medical probe 100, a connector part 150 is arranged to optically and electrically connect the scanning medical probe 10 to a light source device (not shown) or an image processing device (not shown). A sheath 132 having an elasticity (not shown in FIG. 2 for convenience of explanation) is provided to extend from the connector part 150 to the tip part 130 to protect various inner components of the scanning medical probe 100. The outer diameter of the sheath 132 is extremely small relative to a conventional electronic-scope because the scanning medical probe 100 does not employ a solid state imaging device. Therefore, the scanning medical probe 100 according to the embodiment achieves a further lower degree of invasiveness relative to a conventional electronic-scope.

As shown in FIG. 1, the scanning medical probe 100 includes a single mode fiber 112. The single mode fiber 112 is formed to extend from the connector part 150 to the tip part 130, and is accommodated in the sheath 132. An input end face (not shown) of the single mode fiber 112 is finely positioned so that when the connector part 150 is connected to the light source device, the input end face of the single mode fiber 112 is coupled to a light source with a high degree of efficiency. A light beam incident on the input end face of the single mode fiber 112 propagates through the single mode fiber 112 while repeating total reflection. The light beam propagating through the single mode fiber 112 is then emitted from an exit end face 112b of the single mode fiber 112.

As shown in FIGS. 1 and 2, a support body 134 is provided in the sheath 132. A tip part 112c of the single mode fiber 112 is inserted into a through hole formed in the support body 134, and is supported by the support body 134 in a state of a cantilever beam. Further, the support body 134 supports a pair of actuators 136 and 138 and an inner frame 144 (not shown in FIG. 2 for convenience of explanation). Each of the actuators 136 and 138 is a piezoelectric device on which electrodes are arranged at predetermined positions thereon. The electrodes of the actuators 136 and 138 are connected to conductive wires (not shown) whose ends are located in the connection part 150. In the state where the connector part 150 is connected to an image processing apparatus, alternating voltages which have a predetermined frequency and have phases orthogonal to each other are respectively applied to the actuators 136 and 138 via the conductive wires during a predetermined time period.

Materials and shapes of the actuators 136 and 138 are selected so that when the alternating voltages having the predetermined frequency are applied to the actuators 136 and 138, the actuators 136 and 138 produces resonance motions in X direction and Y direction, respectively, in a lateral vibration mode. Since the kinetic energy in X direction and the kinetic energy in Y direction of the actuators 136 and 138 are combined, the exit end face 112b of the single mode fiber 112 produces a circular motion to draw a predetermined track whose center corresponds to a position of a center axis AX on a plane (hereafter, referred to as an "approximate X-Y plane") nearly equal to a X-Y plane. For example, the predetermined track is a vortical track whose center corresponds to the position of the center axis AX. The diameter of the vortical track drawn by the exit end face 112b during the predetermined period becomes larger in proportion to the voltage applied to the actuators 136 and 138. The light beam entering the input end face of the single mode fiber 112 is continuously emitted from the exit end face 112b of the single mode fiber 112. It should be noted that the predetermined track drawn by the exit end face 112b of the single mode fiber 112 is not limited to a track whose center corresponds to the position of the center axis AX. For example, the predetermined track may be a linear track, such as a raster scanning (horizontal scanning) track.

As shown in FIG. 1, the tip of the inner frame 144 is sealed by a scanning objective lens 140 (not shown in FIG. 2 for convenience of explanation) which is positioned such that an optical axis of the objective lens 140 coincides with the center axis AX. The light beam emitted from the exit end face 112b of the single mode fiber 112 forms a beam spot on an observation target through the scanning objective lens 140. It should be noted that in FIG. 1 the scanning objective lens 140 is illustrated as a single lens for convenience of illustration. However, the scanning objective lens 140 according to the embodiment includes a plurality of lenses. A concrete configuration of the scanning objective lens 140 is explained later.

As shown in FIG. 2, on an end face 134a of the support body 134, a plurality of circularly arranged through holes are formed to penetrate through the support body 134. In each of the plurality of through holes, a detection fiber 142 has been inserted. In FIG. 2, only one detection fiber 142 is indicated by a dashed line for the sake of simplicity. A part of each detection fiber 142 extending from the through hole toward the scanning objective lens 140 is sandwiched in a space between the sheath 132 and the inner frame 144, and a tip (an input end face 142a) of the detection fiber 142 is situated at a distal end face of the scanning medical probe 100. Although not shown in FIG. 2, detection fibers 142 are tied in a bundle on a rear side of the support body 134 to form a single optical fiber.

The beam spot formed on the observation target is reflected from the observation target, and enters the detection fibers 142. The light beam which has entered input end faces 142a of the detection fibers 142 propagates through an inner part of the fiber bundle toward the end of the fiber bundle. Then, the light beam which has reached the end of the fiber bundle enters a photodetector provided in the image processing apparatus through the connector part 150 to be used for image processing.

As described above, in the scanning medical probe 100, the exit end face 112b of the single mode fiber 112 moves on the approximate XY plane in contrast to an conventional electronic-scope in which an exit end face of an optical fiber for emitting illumination light stays motionless. In order to suitably assist a doctor to securely find an effected area, the scanning medical probe is required to have the specification of a wide angle of view larger than or equal to 100° (which is equivalent to ±50° with respect to the center axis AX of the scanning medical probe 100). To achieve such a wide angle of view, it is required to set a moving range of the single mode fiber 112 large. However, the diameter of the scanning objective lens 140 is required to be increased in proportion to increase of the moving range of the exit end face 112b of the single mode fiber 112 so that the aberrations can be suitably suppressed.

Figure 3:
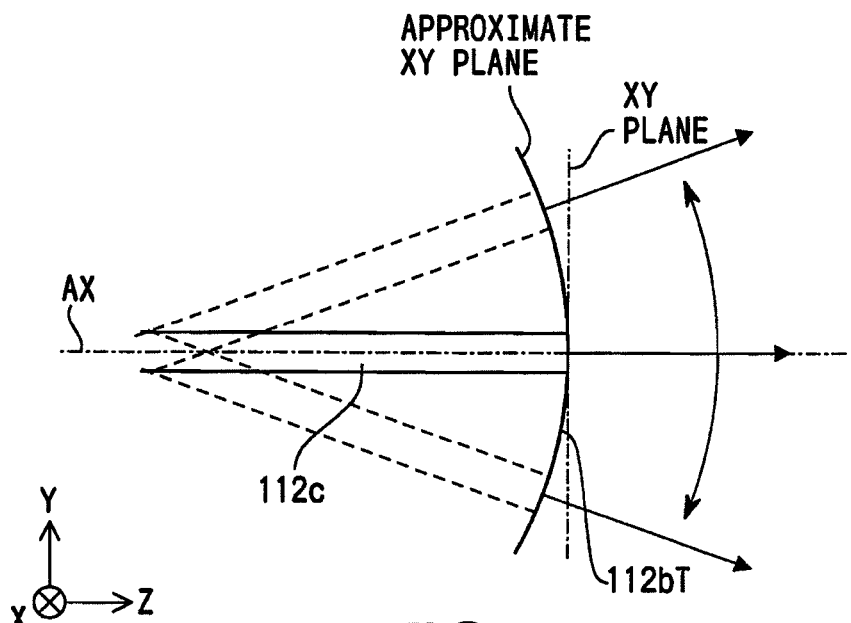
FIG. 3 is an explanatory illustration for explaining an approximate XY plane on which an exit end face of a single mode fiber of the scanning medical probe moves.

FIG. 3 is an explanatory illustration for explaining the approximate XY plane on which the exit end face 112b of the single mode fiber 112 moves. It should be noted that in FIG. 3 only the tip part 112c of the single mode fiber 112 moved by resonance energy is illustrated for convenience of illustration. As shown in FIG. 3, the approximate XY plane is curved toward the proximal end of the single mode fiber 112 with respect to the XY plane (in other words, the approximate XY plane is a curved plane which is convex toward the scanning objective lens 140). The curved amount of the approximate XY plane with respect to the XY plane becomes larger at a point father from the center axis AX.

Figure 4:
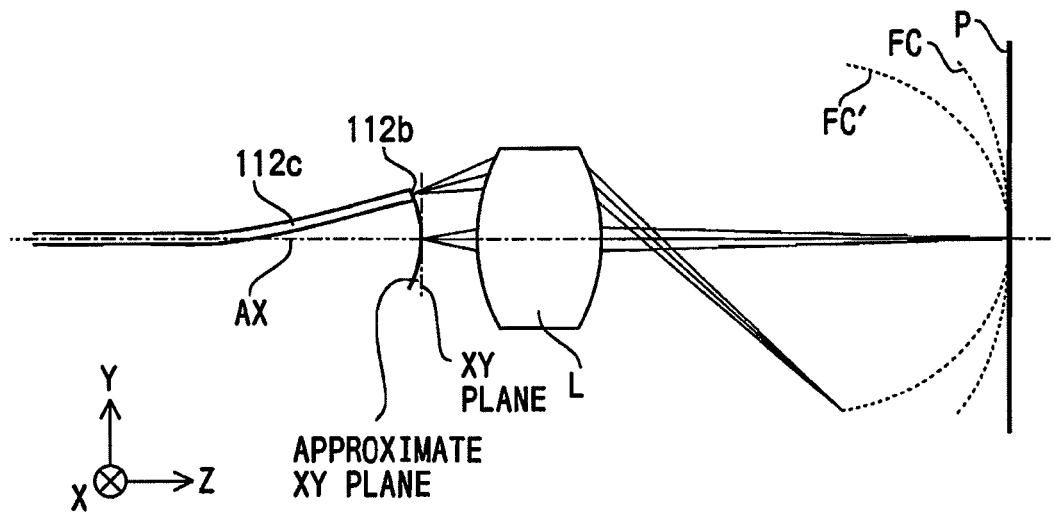
FIG. 4 is an explanatory illustration for explaining a relationship between an object height and an image height in the scanning medical probe.

FIG. 4 is an explanatory illustration for explaining a relationship between an object height (i.e., a distance of a light source from an optical axis) and an image height (i.e., a distance of an image of a light source from the optical axis) in a scanning medical probe. The scanning medical probe shown in FIG. 4 has a scanning objective lens L which is different from the scanning objective lens 140 according to the embodiment.

A reference symbol FC in FIG. 4 indicates an image plane (i.e., an observation plane) of the scanning objective lens L defined when an object plane is the XY plane. Regarding design of the scanning objective lens L, as a result of controlling the various aberrations to achieve the suitable performance, the curvature of filed remains in an undercorrected direction with respect ton an ideal image plane P. However, the remaining amount of curvature of filed is lower than or equal to a permissible amount. As a result, the peripheral resolution satisfying the specification can be obtained. Therefore, there is no problem. On the other hand, a reference symbol FC' represents an image plane of the scanning objective lens L defined when the object plane is the approximate XY plane. In this case, the object plane curved in the undercorrected direction in proportion to the object height further causes bending of the curvature of field which has remained originally in the undercorrected direction. Therefore, in this case, the peripheral resolution deteriorates. As described in detail below, according to the embodiment of the invention, the curvature of field which is occurred largely in the undercorrected direction is suitably corrected.

The inventor of the present invention has recognized the above explained problem caused by movement of a light source (i.e., movement of the exit end face 112b of the single mode fiber 112), and has designed the scanning objective lens 140 as described below to solve the above described problem.

Figure 5:
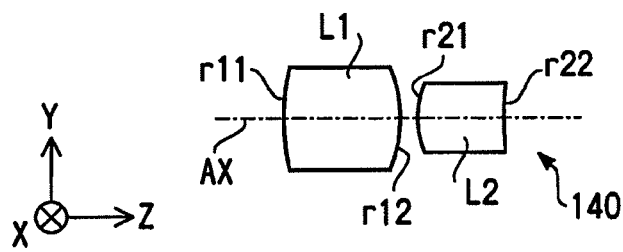
FIG. 5 is a side view illustrating a configuration of a scanning objective lens according to the embodiment (a first example) of the invention.
Figure 19A:
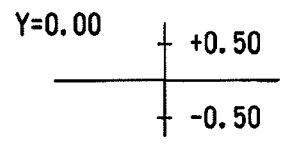
FIGS. 19A-19D are graphs illustrating lateral aberrations of the scanning objective lens according to the fifth example of the invention.
Figure 19B:
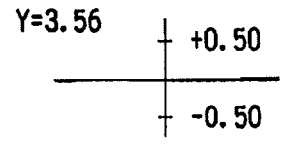
Figure 19C:
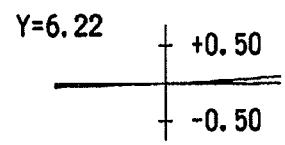
Figure 19D:
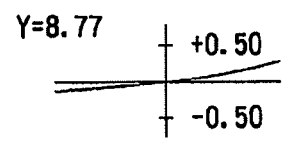
Figure 31A:
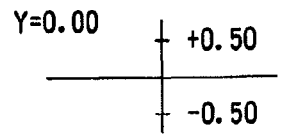
FIGS. 31A-31D are graphs illustrating lateral aberrations of the scanning objective lens according to the comparative example 2 of the invention.
Figure 31B:
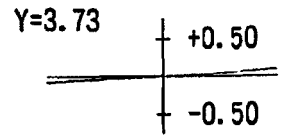
Figure 31C:
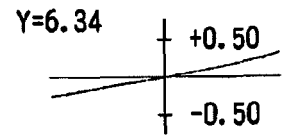
Figure 31D:
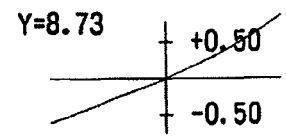

FIG. 5 is a side view illustrating a configuration of the scanning objective lens 140 according to the embodiment (a first example which is described in detail later) of the invention. The scanning objective lens 140 according to the embodiment is explained with reference to FIG. 5. On each of the configuration diagrams of the scanning objective lens 140 (i.e., FIG. 5 and the following similar drawings), the left side corresponds to the exit end face 112b side of the single mode fiber 112 (i.e., the object side), and the right side corresponds to the image plane side (i.e., the observation plane side).

As shown in FIG. 5, the scanning objective lens 140 has a first lens group L1 and a second lens group L2 arranged in this order from the object side. Each of the first and second lens groups L1 and L2 has a positive power. Although FIG. 5 is illustrated such that each the first and second lens groups L1 and L2 is a single lens, the present invention is not limited to such a configuration. Each of the first and second lens groups L1 and L2 may be formed of a plurality of lenses (e.g., a cemented lens in which a plurality of lenses are cemented together). In the following, regarding each optical component configuring the scanning objective lens 140, an object side surface of the optical component is referred to as a first surface, and an image side surface of the optical component is referred to as a second surface. Furthermore, a first surface of lens surfaces in the first lens group L1 nearest to the object plane is assigned a reference symbol "r11", and a second surface of lens surfaces in the first lens group L1 nearest to the image plane is assigned a reference symbol "r12". Furthermore, a first surface of lens surfaces in the second lens group L2 nearest to the object plane is assigned a reference symbol "r21", and a second surface of lens surfaces in the first lens group L2 nearest to the image plane is assigned a reference symbol "r22".

When f1 (unit: mm) denotes the focal length of the first lens group L1, f2 (unit: mm) denotes the focal length of the second lens group L2, R1a (unit: mm) denotes the curvature radius of the first surface r11 of the first lens group L1, and R1b (unit: mm) denotes the curvature radius of the second surface r12 of the first lens group L1, the scanning objective lens 140 is configured to satisfy the following conditions (1) and (2).

$$0.60 < f1/f2 < 1.25 \quad (1)$$

$$0.95 < |R1a/R1b| < 2.50 \quad (2)$$

Regarding a conventional scanning objective lens, since light emerging from a single mode fiber is directed to deviate from an optical axis when a single mode fiber oscillates, it is necessary to design the diameter of the scanning objective lens to be larger than the amplitude of movement of the single mode fiber. By contrast, according to the embodiment of the invention, by configuring the scanning objective lens 140 to satisfy the conditions (1) and (2) simultaneously, it becomes possible to assign a positive power to the first lens group L1 arranged on the light source side so that the light beam emerging from the exit end face 112b of the single mode fiber 112 is refracted toward the optical axis. Consequently, it becomes possible to suitably suppress the aberrations such as the curvature of field, the coma and the astigmatism while preventing increase of the diameter of the scanning objective lens 140 due to the above described problem.

When f1/f2 of the condition (1) gets larger than the upper limit of the condition (1), the power of the first lens group L1 which refracts the light beam emerging from the exit end face 112b of the single mode fiber 112 toward the optical axis becomes weak, and therefore it becomes necessary to design the scanning objective lens 140 to have a large lens diameter. Furthermore, in this case it is necessary to assign a substantial power to the second lens group L2 to secure the total positive power of the scanning objective lens 140. As a result, the curvature radius of the first surface r21 which has a relatively strong positive power in the second lens group L2 becomes small, and therefore the Petzval value becomes larger and the curvature of field becomes large.

When f1/f2 of the condition (1) gets smaller than the lower limit of the condition (1), the power of the first lens group L1 becomes too strong, and therefore the coma and the astigmatism due to the first lens group L1 occur largely.

When |R1a/R1b| gets larger than the upper limit of the condition (2), the astigmatism due to the second surface r12 of the first lens group L1 becomes large, and the power of the first surface r11 of the first lens group L1 which refracts the light beam emerging from the exit end face 112b of the single mode fiber 112 becomes weak. As a result, it becomes necessary to increase the diameter of the scanning objective lens 140.

When |R1a/R1b| gets smaller than the lower limit of the condition (2), the power of the first surface r11 of the first lens group L1 becomes too strong, and therefore the coma due to the first surface r11 becomes large.

In order to suitably correct the curvature of field which is caused largely by the object plane curved in the undercorrected direction, the scanning objective lens 140 may be configured such that the second surface r22 of the second lens group L2 is formed to be a concave surface and the scanning objective lens 140 satisfies a condition:

$$1.25 < R2b/f < 4.80 \quad (3)$$

where R2b (unit: mm) denotes a curvature radius of the second surface r22, and f (unit: mm) denotes a total focal length of the scanning objective lens 140.

When R2b/f gets larger than the upper limit of the condition (3), the power of the second surface r22 is weak, and therefore the curvature of filed becomes an undercorrected condition.

When R2b/f gets smaller than the lower limit of the condition (3), it becomes necessary to set the curvature radius of the first surface r21 (a convex surface) of the second lens group L2 to be small so as to secure the positive power of the second lens group L2. As a result, the curvature of field due to the first surface r21 becomes large, and thereby the peripheral resolution deteriorates considerably. In addition, since the curvature radius of the first surface r21 becomes small, it becomes impossible to secure a proper peripheral part thickness of the second lens group L2. If the peripheral part thickness of the second lens group L2 becomes small, processing of the second lens group L2 becomes difficult, which causes a considerable degree of disadvantage in a manufacturing process of the second lens group L2. In addition, in this case the power of the second surface r22 of the second lens group L2 becomes too strong, and therefore the coma due to the second surface r22 becomes large.

When the observation target is imaged with light of multiple wavelengths, a chromatic aberration may be caused by the scanning objective lens 140. Deterioration of the image quality by such a chromatic aberration can be corrected electrically to some extent by image processing on the image processing device. However, correction of an image in an electrical way (e.g., image processing) has poor performance in color reproduction, and increases a noise level of the image. In addition, if resolution varies depending on the wavelength of light due to the chromatic aberration, it is difficult to correct such variation of resolution. Therefore, it is desirable to suppress the chromatic aberration itself caused in the scanning objective lens 140.

Hereafter, a variation of the scanning objective lens 140 configured such that the chromatic aberration is suitably corrected is explained with reference to FIG. 20. FIG. 20 illustrates a variation (a sixth example described later) of a configuration of the scanning objective lens 140.

As shown in FIG. 20, the variation of the scanning objective lens 140 has a first lens group L1, a second lens group L2, and a third lens group L3 arranged in this order from the object side. The first lens group L1 is a cemented lens configured by cementing tow lenses (positive and negative lenses) together, and has a positive power in total. If an object side lens of the cemented lens is configured to be a positive lens, a cementing surface of the cemented lens becomes a concave surface on the object side. Therefore, in this case, an axial light ray is incident on the cementing surface at a small incident angle with respect to a normal to the cementing surface, and therefore it becomes impossible to obtain a sufficient effect of correction of the axial chromatic aberration. In addition, in this case it becomes necessary to select material having a high degree of dispersion as material of a negative lens of the cemented lens arranged on the image side, and therefore the amount of chromatic aberration due to the second surface 12 of the first lens group L1 becomes large. To solve such a drawback, the first lens group L1 according to the variation shown in FIG. 20 is configured to be a cemented lens in which a negative lens L11 and a positive lens L12 arranged in this order from the object side are cemented together.

Each of the first lens group L1 and the second lens group L2 has a positive power, and the third lens group L3 has a negative power. In FIG. 20, a reference symbol r13 is assigned the cementing surface between the negative lens L11 and the positive lens L12. Furthermore, a reference symbol r31 is assigned to the first surface of lens surfaces in the third lens group L3 nearest to the object side, and a reference symbol r32 is assigned to the second surface of lens surfaces in the third lens group L3 nearest to the image side.

In order to suitably correct the axial chromatic aberration and the chromatic difference of magnification, the scanning objective lens 140 shown in FIG. 20 may be configured to satisfy conditions:

$$0.35 < d11/d1 < 0.60 \quad (4)$$

$$20 < v12 - v11 \quad (5)$$

where d1 (unit: mm) denotes the thickness of the first lens group L1 on the optical axis, d11 (unit: mm) denotes the thickness of the negative lens L11 on the optical axis, v11 denotes Abbe number with respect to e-line of the negative lens L11, and v12 denotes Abbe number with respect to e-line of the positive lens L12.

When d11/d1 gets larger than the upper limit of the condition (4), it becomes necessary to increase the curvature radius of the cementing surface r13 to secure the peripheral part thickness of the positive lens L12, and therefore the chromatic aberration becomes an undercorrected condition.

When d11/d1 gets smaller than the lower limit of the condition (4), the diameter of the light beam on the cementing surface r13 is small, and therefore it is impossible to suitably correct the axial chromatic aberration.

When the condition (5) is not satisfied, the curvature radius of the cementing surface r13 becomes small, and therefore it becomes difficult to secure the peripheral part thickness of the positive lens L12. In addition, processing of the positive lens L12 becomes difficult, which causes a considerable degree of disadvantage in a manufacturing process of the positive lens L12.

In the scanning objective lens 140 according to the variation shown in FIG. 20, the first surface r31 of the third lens group L3 is formed to be a concave surface. By assigning a negative power to the third lens group L3, further increase of the angle of view and more suitable correction of aberrations can be achieved, and the degree of design freedom of the first lens group L1 or the second lens group L2 can be increased.

Hereafter, another variation of the scanning objective lens 140 configured to suitably correct the chromatic aberration is explained with reference to FIG. 17. FIG. 17 is a side view illustrating a variation (a fifth example described in detail later) of a configuration of the scanning objective lens 140.

As shown in FIG. 17, the scanning objective lens 140 has a first lens group L1, a second lens group L2 and a cover glass CG arranged in this order from the object side. The first lens group L1 is configured as a cemented lens in which a negative lens L11 and a positive lens L12 are cemented together. In the first lens group L1, the negative lens L11 is arranged on the object side. The second lens group L2 is configured as a cemented lens in which a positive lens L21 and a negative lens L22 are cemented together. In the second lens group L12, the positive lens L21 is arranged on the object side. Each of the first lens group L1 and the second lens group L2 has a positive power. A reference symbol r23 is assigned to the cementing surface between the positive lens L21 and the negative lens L22. A reference symbol rCG1 is assigned to the first surface of the cover glass CG, and a reference symbol rCG2 is assigned to the second surface of the cover glass CG.

In order to suitably correct the axial chromatic aberration, the scanning objective lens 140 shown in FIG. 17 is configured such that the positive lens L21 of the second lens group L2 is made of glass having a low degree of dispersion and the negative lens L22 is made of glass having a high degree of dispersion. The scanning objective lens 140 shown in FIG. 17 is configured to satisfy a condition:

$$v22 < 25 \quad (6)$$

where v22 denotes Abbe number of the negative lens L22 with respect to e-line.

Since the positive lens L21 has a strong positive power, the chromatic aberration becomes large when the positive lens L21 is made of glass having a high degree of dispersion. For this reason, the negative lens L22 is made of glass having a high degree of dispersion, and the second surface r22 (i.e., the observation target side surface) of the negative lens L22 is formed to be a concave surface so that the curvature of field and the axial chromatic aberration can be suitably corrected simultaneously. When the condition (6) is not satisfied, the axial chromatic aberration is brought to an undercorrected condition.

Hereafter, seven concrete numerical examples (first to seventh examples) of the scanning objective lens 140 are explained. The scanning objective lens 140 according to each of the first to seventh examples is arranged at the tip part 130 of the scanning medial probe 100.

First Example

As described above, the configuration of the scanning objective lens 140 according to the first example is illustrated in FIG. 5. The specifications of the scanning objective lens 140 including a numerical aperture NA, the total focal length f (unit: mm), an optical magnification m, a half angle of view ω (unit: degree), a back focus BF (unit: min) and an image height Y (unit: mm) are as follows.
NA: 0.008
f: 0.45
m: −15.467
ω: 50.4
BF: 6.93
y: 8.43

Table 1 shows a concrete numerical configuration (design values) of the scanning objective lens 140 according to the first example. In Table 1 (and in the following similar tables), R (unit: mm) denotes an curvature radius of a surface of each optical component, D (unit: mm) denotes the thickness of an optical component or the distance (unit: mm) from each optical surface to the next optical surface, "Ne" denotes a refractive index at e-line, and ve denotes Abbe number at e-line. In Table 1, surfaces #1 and #2 respectively denote the first surface r11 and the second surface r12 of the first lens group L1, surfaces #3 and #4 respectively denote the first surface r21 and the second surface r22 of the second lens group L2. In the first example (and in the following examples and comparative examples), the exit end face 112b of the single mode fiber 112 moves on a spherical plane (i.e., the approximate XY plane) having a radius of 3.94 mm.

TABLE 1

| Surface No. | R | D | Ne | νe |
|---|---|---|---|---|
| 1 | 1.731 | 0.850 | 1.88814 | 40.5 |
| 2 | −0.931 | 0.120 | — | — |
| 3 | 0.620 | 0.620 | 1.88814 | 40.5 |
| 4 | 0.846 | — | — | — |

FIGS. 6A-6D are graphs illustrating the aberrations of the scanning objective lens 140 according to the first example. Specifically, FIG. 6A illustrates the spherical aberration and the axial chromatic aberration at e-line, g-line and C-line. FIG. 6B illustrates the chromatic difference of magnification at e-line, g-line and C-line. In FIGS. 6A and 6B, a curve indicated by a solid line represents the aberration at e-line, a curve indicated by a dashed line represents the aberration at g-line, and a curve indicated by a chain line represents the aberration at C-line. FIG. 6C illustrates the astigmatism. In FIG. 6C, a curve indicated by a solid line represents a sagittal component, and a curve indicated by a dashed line represents a meridional component. FIG. 6D illustrates the distortion. In FIG. 6A, the vertical axis represents the coordinate of the entrance pupil. In each of FIGS. 6B-6D, the vertical axis represents the image height, and the horizontal line represents the amount of aberration. In FIG. 6D, the vertical axis represents the image height, and the horizontal axis represents the distorted amount of an image.

FIGS. 7A-7D are graphs illustrating the lateral aberration of the scanning objective lens 140 at e-line for each of the image heights shown in FIGS. 7A-7D. In each of FIGS. 7A-7D, the vertical axis represents the amount of the lateral aberration, and the horizontal axis represents the coordinate of the entrance pupil. In each of FIGS. 7A-7D, the left side of the horizontal axis represents a lower light ray, and the right side of the horizontal axis represents an upper light ray. FIGS. 7A-7D illustrate the lateral aberration of a light ray at the image heights of 0.00 mm, 3.54 mm, 6.03 mm and 8.43 mm, respectively.

As shown in FIGS. 6A-6D and 7A-7D, the scanning objective lens 140 according to the first example is configured to suitably correct the aberrations. The above described definitions regarding FIGS. 6A-6D and 7A-7D also apply to the following similar drawings.

Second Example

Hereafter, a second example of the invention is described. FIG. 8 is a side view illustrating a configuration of the scanning objective lens 140 according to the second example. The scanning objective lens 140 according to the second example includes the first lens group L1 and the second lens group L2 arranged in this order from the object side. Each of the first and second lens groups L1 and L2 is a single lens. The specifications of the scanning objective lens 140 according to the second example are as follows.
NA: 0.008
f: 0.44
m: −16.363
ω: 49.5
BF: 7.16
y: 8.41

Table 2 shows a concrete numerical configuration (design values) of the scanning objective lens 140 according to the second example. The definitions of the surface numbers in the first example also apply to the second example.

TABLE 2

| Surface No. | R | D | Ne | νe |
|---|---|---|---|---|
| 1 | 1.450 | 0.738 | 1.82017 | 46.4 |
| 2 | −0.908 | 0.063 | — | — |
| 3 | 0.618 | 0.620 | 1.88814 | 40.5 |
| 4 | 1.748 | — | — | — |

FIGS. 9A-9D are graphs illustrating the aberrations of the scanning objective lens 140 according to the second example. Specifically, FIG. 9A illustrates the spherical aberration and the axial chromatic aberration at the e-line, g-line and C-line. FIG. 9B illustrates the chromatic difference of magnification at the e-line, g-line and C-line. FIG. 9C illustrates the astigmatism. FIG. 9D illustrates the distortion. FIGS. 10A-10D are graphs illustrating the lateral aberration of the scanning objective lens 140 at e-line for each of the image heights shown in FIGS. 10A-10D. As shown in FIGS. 9A-9D and 10A-10D, the scanning objective lens 140 according to the second example is configured to suitably correct the aberrations.

Third Example

Hereafter, a third example of the invention is described. FIG. 11 is a side view illustrating a configuration of the scanning objective lens 140 according to the third example. The scanning objective lens 140 according to the third example includes the first lens group L1, the second lens group L2 and the cover glass CG arranged in this order from the object side. Each of the first and second lens groups L1 and L2 is a single lens. The specifications of the scanning objective lens 140 according to the third example are as follows.
NA: 0.008
f: 0.46
m: −16.221
ω: 59.3
BF: 7.09
y: 12.31

Table 3 shows a concrete numerical configuration (design values) of the scanning objective lens 140 according to the third example. The definitions of the surface numbers in the first example also apply to the third example. The surfaces #5 and #6 respectively correspond to the first surface rCG1 and the second surface rCG2 of the cover glass CG.

TABLE 3

| Surface No. | R | D | Ne | νe |
|---|---|---|---|---|
| 1 | 1.259 | 0.668 | 1.88814 | 40.5 |
| 2 | −1.259 | 0.125 | — | — |
| 3 | 0.564 | 0.557 | 1.88814 | 40.5 |
| 4 | 1.689 | 0.070 | — | — |
| 5 | INFINITY | 0.300 | 1.51825 | 63.9 |
| 6 | INFINITY | — | — | — |

FIGS. 12A-12D are graphs illustrating the aberrations of the scanning objective lens 140 according to the third example. Specifically, FIG. 12A illustrates the spherical aberration and the axial chromatic aberration at the e-line, g-line and C-line. FIG. 12B illustrates the chromatic difference of magnification at the e-line, g-line and C-line. FIG. 12C illustrates the astigmatism. FIG. 12D illustrates the distortion. FIGS. 13A-13D are graphs illustrating the lateral aberration of the scanning objective lens 140 at e-line for each of the image heights shown in FIGS. 13A-13D. As shown in FIGS. 12A-12D and 13A-13D, the scanning objective lens 140 according to the third example is configured to suitably correct the aberrations.

Fourth Example

Hereafter, a fourth example of the invention is described. FIG. 14 is a side view illustrating a configuration of the scanning objective lens 140 according to the fourth example. The scanning objective lens 140 according to the fourth example includes the first lens group L1, the second lens group L2 and the cover glass CG arranged in this order from the object side. The first lens group L1 is a cemented lens in which the negative lens L11 and the positive lens L12 arranged in this order from the object side are cemented together. The second lens group L2 is a single lens. The specifications of the scanning objective lens 140 according to the fourth example are as follows.

NA: 0.008
f: 0.44
m: −16.345
ω: 50.7
BF: 6.85
y: 8.72

Table 4 shows a concrete numerical configuration (design values) of the scanning objective lens 140 according to the fourth example. In Table 4, surfaces #1, #2 and #3 correspond to the first surface r11 of the negative lens L11, the cementing surface r13 between the negative lens L11 and the positive lens L12, and the second surface r12 of the positive lens L12, respectively. Surfaces #4 and #5 correspond to the first surface r21 and the second surface r22 of the second lens group L2, respectively. Surfaces #6 and #7 correspond to the first surface rCG1 and the second surface rCG2 of the cover glass CG, respectively.

TABLE 4

| Surface No. | R | D | Ne | νe |
|---|---|---|---|---|
| 1 | 1.624 | 0.446 | 1.93430 | 18.7 |
| 2 | 0.696 | 0.496 | 1.77621 | 49.3 |
| 3 | −0.696 | 0.062 | — | — |
| 4 | 0.546 | 0.645 | 1.73234 | 54.4 |
| 5 | 0.671 | 0.062 | — | — |
| 6 | INFINITY | 0.350 | 1.51825 | 63.9 |
| 7 | INFINITY | — | — | — |

FIGS. 15A-15D are graphs illustrating the aberrations of the scanning objective lens 140 according to the fourth example. Specifically, FIG. 15A illustrates the spherical aberration and the axial chromatic aberration at the e-line, g-line and C-line. FIG. 15B illustrates the chromatic difference of magnification at the e-line, g-line and C-line. FIG. 15C illustrates the astigmatism. FIG. 15D illustrates the distortion. FIGS. 16A-16D are graphs illustrating the lateral aberration of the scanning objective lens 140 at e-line for each of the image heights shown in FIGS. 16A-16D. As shown in FIGS. 15A-15D and 16A-16D, the scanning objective lens 140 according to the fourth example is configured to suitably correct the aberrations.

Fifth Example

Hereafter, a fifth example of the invention is described. As described above, FIG. 17 is a side view illustrating a configuration of the scanning objective lens 140 according to the fifth example. The scanning objective lens 140 according to the fifth example includes the first lens group L1, the second lens group L2 and the cover glass CG arranged in this order from the object side. The specifications of the scanning objective lens 140 according to the fifth example are as follows.

NA: 0.007
f: 0.44
m: −17.538
ω: 49.1
BF: 7.30
y: 8.77

Table 5 shows a concrete numerical configuration (design values) of the scanning objective lens 140 according to the fifth example. In Table 5, surfaces #1, #2 and #3 correspond to the first surface r11 of the negative lens L11, the cementing surface r13 between the negative lens L11 and the positive lens L12, and the second surface r12 of the positive lens L12, respectively. Surfaces #4, #5 and #6 correspond to the first surface r21 of the positive lens L21, the cementing surface r23 between the positive lens L21 and the negative lens L22, and the second surface r22 of the negative lens L22, respectively. Surfaces #7 and #8 correspond to the first surface rCG1 and the second surface rCG2 of the cover glass CG, respectively.

TABLE 5

| Surface No. | R | D | Ne | νe |
|---|---|---|---|---|
| 1 | 1.756 | 0.391 | 1.93430 | 18.7 |
| 2 | 0.818 | 0.592 | 1.83945 | 42.5 |
| 3 | −0.818 | 0.063 | — | — |
| 4 | 0.635 | 0.441 | 1.83945 | 42.5 |
| 5 | INFINITY | 0.302 | 1.85504 | 23.6 |
| 6 | 0.794 | 0.050 | — | — |
| 7 | INFINITY | 0.400 | 1.51825 | 63.9 |
| 8 | INFINITY | — | — | — |

FIGS. 18A-18D are graphs illustrating the aberrations of the scanning objective lens 140 according to the fifth example. Specifically, FIG. 18A illustrates the spherical aberration and the axial chromatic aberration at the e-line, g-line and C-line. FIG. 18B illustrates the chromatic difference of magnification at the e-line, g-line and C-line. FIG. 18C illustrates the astigmatism. FIG. 18D illustrates the distortion. FIGS. 19A-19D are graphs illustrating the lateral aberration of the scanning objective lens 140 at e-line for each of the image heights shown in FIGS. 19A-19D. As shown in FIGS. 18A-18D and 19A-19D, the scanning objective lens 140 according to the fifth example is configured to suitably correct the aberrations.

Sixth Example

Hereafter, a sixth example of the invention is described. As described above, FIG. 20 is a side view illustrating a configuration of the scanning objective lens 140 according to the sixth example. The specifications of the scanning objective lens 140 according to the sixth example are as follows.

NA: 0.008
f: 0.43
m: −16.956

ω: 50.0

BF: 6.95 y: 8.57

Table 6 shows a concrete numerical configuration (design values) of the scanning objective lens 140 according to the sixth example. In Table 6, surfaces #1, #2 and #3 correspond to the first surface r11 of the negative lens L11, the cementing surface r13 between the negative lens L11 and the positive lens L12, and the second surface r12 of the positive lens L12, respectively. Surfaces #4 and #5 correspond to the first surface r21 and the second surface r22 of the second lens group L2, respectively. Surfaces #6 and #7 correspond to the first surface rCG1 and the second surface rCG2 of the cover glass CG, respectively.

TABLE 6

| Surface No. | R | D | Ne | νe |
|---|---|---|---|---|
| 1 | 1.371 | 0.625 | 1.93430 | 18.7 |
| 2 | 0.701 | 0.450 | 1.73234 | 54.4 |
| 3 | −0.762 | 0.060 | — | — |
| 4 | 0.557 | 0.662 | 1.88814 | 40.5 |
| 5 | 0.883 | 0.080 | — | — |
| 6 | −1.000 | 0.340 | 1.51825 | 63.9 |
| 7 | INFINITY | — | — | — |

FIGS. 21A-21D are graphs illustrating the aberrations of the scanning objective lens 140 according to the sixth example. Specifically, FIG. 21A illustrates the spherical aberration and the axial chromatic aberration at the e-line, g-line and C-line. FIG. 21B illustrates the chromatic difference of magnification at the e-line, g-line and C-line. FIG. 21C illustrates the astigmatism. FIG. 21D illustrates the distortion. FIGS. 22A-22D are graphs illustrating the lateral aberration of the scanning objective lens 140 at e-line for each of the image heights shown in FIGS. 22A-22D. As shown in FIGS. 21A-21D and 22A-22D, the scanning objective lens 140 according to the sixth example is configured to suitably correct the aberrations.

Seventh Example

Hereafter, a seventh example of the invention is described. As described above, FIG. 23 is a side view illustrating a configuration of the scanning objective lens 140 according to the seventh example. The scanning objective lens 140 according to the seventh example includes the first lens L1 and the second lens L2 arranged in this order from the object side. Each of the first and second lenses L1 and L2 is a single lens. The specifications of the scanning objective lens 140 according to the seventh example are as follows.

NA: 0.008 f: 0.44 m: −16.108

ω: 50.1

BF: 7.01 y: 8.43

Table 7 shows a concrete numerical configuration (design values) of the scanning objective lens 140 according to the seventh example. The definitions of the surface numbers in the first example also apply to the seventh example.

TABLE 7

| Surface No. | R | D | Ne | νe |
|---|---|---|---|---|
| 1 | 1.330 | 0.722 | 1.88814 | 40.5 |
| 2 | −0.997 | 0.060 | — | — |
| 3 | 0.657 | 0.664 | 1.88814 | 40.5 |
| 4 | 2.079 | — | — | — |

FIGS. 24A-24D are graphs illustrating the aberrations of the scanning objective lens 140 according to the seventh example. Specifically, FIG. 24A illustrates the spherical aberration and the axial chromatic aberration at the e-line, g-line and C-line. FIG. 24B illustrates the chromatic difference of magnification at the e-line, g-line and C-line. FIG. 24C illustrates the astigmatism. FIG. 24D illustrates the distortion. FIGS. 25A-25D are graphs illustrating the lateral aberration of the scanning objective lens 140 at e-line for each of the image heights shown in FIGS. 25A-25D. As shown in FIGS. 24A-24D and 25A-25D, the scanning objective lens 140 according to the seventh example is configured to suitably correct the aberrations.

The following Table 8 shows values of the conditions (1) to (6) in the first to seventh examples, respectively. As shown in Table 8, the conditions (1) to (6) are satisfied in all of the first to seventh examples. Therefore, the scanning objective lens 140 according to each of the first to seventh examples is able to achieve the suitable optical performance while also achieving downsizing and the wide angle of view.

TABLE 8

| CONDITION | 1ST EXAMPLE | 2ND EXAMPLE | 3RD EXAMPLE | 4TH EXAMPLE |
|---|---|---|---|---|
| (1) | 0.703 | 0.926 | 1.048 | 0.648 |
| (2) | 1.859 | 1.597 | 1.000 | 2.333 |
| (3) | 1.876 | 3.982 | 3.712 | 1.525 |
| (4) | — | — | — | 0.473 |
| (5) | — | — | — | 30.6 |
| (6) | — | — | — | — |

| CONDITION | 5TH EXAMPLE | 6TH EXAMPLE | 7TH EXAMPLE |
|---|---|---|---|
| (1) | 0.680 | 1.030 | 0.847 |
| (2) | 2.147 | 1.799 | 1.334 |
| (3) | 1.813 | 1.937 | 4.736 |
| (4) | 0.398 | 0.581 | — |
| (5) | 23.8 | 35.7 | — |
| (6) | 23.6 | — | — |

Next, the optical performance of the scanning objective lens according to each of the first to seventh examples is verified with reference to three types of comparative examples.

FIG. 26 is a side view illustrating a configuration of a scanning objective lens 240 according to a comparative example 1. FIG. 29 is a side view illustrating a configuration of the scanning objective lens 240 according to a comparative example 2. As in the case of the first example, the scanning objective lens 240 according to each of the comparative examples 1 and 2 includes the first lens group L1 and the second lens group L2 arranged in this order from the object side. Each of the first and second lens groups L1 and L2 is a single lens. The specifications of the scanning objective lens 240 according to the comparative example 1 are as follows.

NA: 0.008 f: 0.47 m: −15.562

ω: 49.5

BF: 7.22
y: 8.51

Table 9 shows a concrete numerical configuration (design values) of the scanning objective lens 240 according to the comparative example 1. The definitions of the surface numbers in the first example also apply to the comparative example 1.

TABLE 9

| Surface No. | R | D | Ne | νe |
|---|---|---|---|---|
| 1 | 1.183 | 0.906 | 1.88814 | 40.5 |
| 2 | −1.286 | 0.139 | — | — |
| 3 | 0.628 | 0.661 | 1.88814 | 40.5 |
| 4 | 0.590 | — | — | — |

FIGS. 27A-27D are graphs illustrating the aberrations of the scanning objective lens 140 according to the comparative example 1. Specifically, FIG. 27A illustrates the spherical aberration and the axial chromatic aberration at the e-line, g-line and C-line. FIG. 27B illustrates the chromatic difference of magnification at the e-line, g-line and C-line. FIG. 27C illustrates the astigmatism. FIG. 27D illustrates the distortion. FIGS. 28A-28D are graphs illustrating the lateral aberration of the scanning objective lens 240 at e-line for each of the image heights shown in FIGS. 28A-28D.

The specifications of the scanning objective lens 240 according to the comparative example 2 are as follows.
NA: 0.008
f 0.45
m: −16.235
ω: 50.1
BF: 7.21
y: 8.73

Table 10 shows a concrete numerical configuration (design values) of the scanning objective lens 240 according to the comparative example 2. The definitions of the surface numbers in the first example also apply to the comparative example 2.

TABLE 10

| Surface No. | R | D | Ne | νe |
|---|---|---|---|---|
| 1 | 1.039 | 0.703 | 1.88814 | 40.5 |
| 2 | −0.998 | 0.121 | — | — |
| 3 | 0.681 | 0.675 | 1.88814 | 40.5 |
| 4 | 2.342 | — | — | — |

FIGS. 30A-30D are graphs illustrating the aberrations of the scanning objective lens 140 according to the comparative example 2. Specifically, FIG. 30A illustrates the spherical aberration and the axial chromatic aberration at the e-line, g-line and C-line. FIG. 30B illustrates the chromatic difference of magnification at the e-line, g-line and C-line. FIG. 30C illustrates the astigmatism. FIG. 30D illustrates the distortion. FIGS. 31A-31D are graphs illustrating the lateral aberration of the scanning objective lens 240 at e-line for each of the image heights shown in FIGS. 31A-31D.

FIG. 32 is a side view illustrating a configuration of the scanning objective lens 240 according to a comparative example 3. As in the case of the fourth example, the scanning objective lens 240 according to the comparative example 3 includes the first lens group L1, the second lens group L2 and the cover glass CG arranged in this order from the object side. The first lens group L1 is configured as a cemented lens in which the negative lens L11 and the positive lens L12 are cemented together. The specifications of the scanning objective lens 240 according to the comparative example 3 are as follows.
NA: 0.008
f: 0.44
m: −16.603
ω: 50.0
BF: 6.99
y: 8.62

Table 11 shows a concrete numerical configuration (design values) of the scanning objective lens 240 according to the comparative example 3. The definitions of the surface numbers in the fourth example also apply to the comparative example 3.

TABLE 11

| Surface No. | R | D | Ne | νe |
|---|---|---|---|---|
| 1 | 1.254 | 0.312 | 1.93430 | 18.9 |
| 2 | 0.481 | 0.625 | 1.77621 | 49.6 |
| 3 | −0.700 | 0.063 | — | — |
| 4 | 0.552 | 0.650 | 1.73234 | 54.7 |
| 5 | 0.661 | 0.050 | — | — |
| 6 | INFINITY | 0.330 | 1.51825 | 64.1 |
| 7 | INFINITY | — | — | — |

Figures 33A, 33B, 33C, 33D:
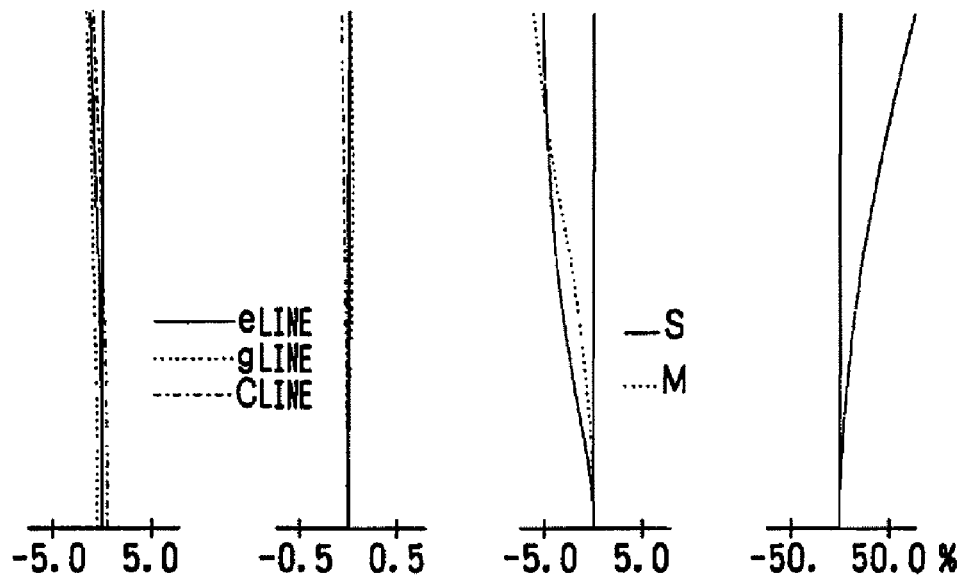
FIGS. 33A-33D are graphs illustrating aberrations of the scanning objective lens according to the comparative example 3 of the invention.
Figure 34A:
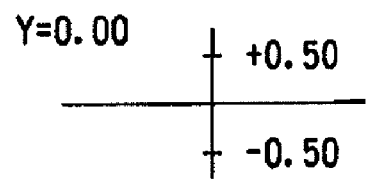
FIGS. 34A-34D are graphs illustrating lateral aberrations of the scanning objective lens according to the comparative example 3 of the invention.
Figure 34B:
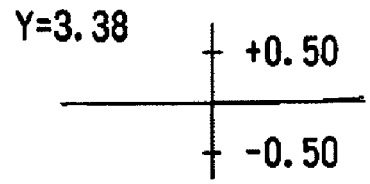
Figure 34C:
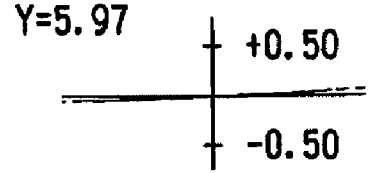
Figure 34D:
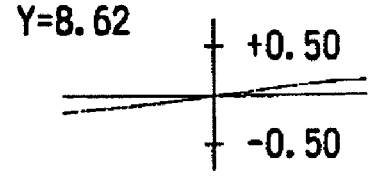

FIGS. 33A-33D are graphs illustrating the aberrations of the scanning objective lens 240 according to the comparative example 3. Specifically, FIG. 33A illustrates the spherical aberration and the axial chromatic aberration at the e-line, g-line and C-line. FIG. 33B illustrates the chromatic difference of magnification at the e-line, g-line and C-line. FIG. 33C illustrates the astigmatism. FIG. 33D illustrates the distortion. FIGS. 34A-34D are graphs illustrating the lateral aberration of the scanning objective lens 240 at e-line for each of the image heights shown in FIGS. 34A-34D.

The following Table 12 shows values of the conditions (1)-(6) in each of the comparative examples 1-3.

TABLE 12

| CONDITION | COMPARATIVE EXAMPLE 1 | COMPARATIVE EXAMPLE 2 | COMPARATIVE EXAMPLE 3 |
|---|---|---|---|
| (1) | 0.549 | 0.753 | 0.615 |
| (2) | 0.920 | 1.041 | 1.791 |
| (3) | 1.258 | 5.193 | 1.500 |
| (4) | — | — | 0.333 |
| (5) | — | — | 30.6 |
| (6) | — | — | — |

As shown in Table 12, in the comparative example 1, the value (f1/f2) of the condition (1) is lower than the lower limit of the condition (1), and the value (|R1a/R1b|) of the condition (2) is lower than the lower limit of the condition (2). In this case, the power of the first lens group L1 becomes too strong, and therefore the coma and the astigmatism in the peripheral area of the first lens group becomes large.

As shown in Table 12, in the comparative example 2, the value (R2b/f) of the condition (3) is larger than the upper limit of the condition (3). Therefore, the negative power of the second surface r22 of the second lens group L2 becomes weak, and the curvature of field becomes the undercorrected condition.

As shown in Table 12, in the comparative example 3, the value (d11/d1) of the condition (4) is lower than the lower limit of the condition (4). In this case, the beam diameter on the cementing surface of the first lens group L1 becomes small, and therefore it becomes impossible to suitably correct the axial chromatic aberration. The following Table 13 shows the axial chromatic aberrations of the fourth to sixth examples and the comparative example 3. In Table 13, the axial chromatic aberration indicates the shifts of g-line and C-line relative to e-line. As shown in Table 13, the objective lens 140 according to each of the fourth to sixth examples is configured to suitably correct the axial chromatic aberration in contrast to the scanning objective lens 240 according to the comparative example 3.

TABLE 13

|  | $4^{TH}$ EXAMPLE | $5^{TH}$ EXAMPLE | $6^{TH}$ EXAMPLE | COMPARATIVE EXAMPLE 3 |
|---|---|---|---|---|
| e-line | 0.013 | 0.041 | 0.044 | −0.473 |
| C-line | 0.283 | 0.339 | 0.371 | 0.535 |

As can be seen from the above described comparison between the scanning objective lens 140 according to each of the first to seventh examples and the scanning objective lens 240 according to each of the comparative examples 1-3, by satisfying at least the conditions (1) and (2), a scanning objective lens suitable for a scanning medical probe can be achieved, while also achieving downsizing and a wide angle of view of an scanning objective lens.

Although the present invention has been described in considerable detail with reference to certain preferred embodiments thereof, other embodiments are possible. For example, the feature of the scanning objective lens 140 or the scanning medical probe 10 may be applied to an apparatus in a field of industrial products. The feature of the scanning objective lens 140 or the scanning medical probe 10 can be applied not only to an apparatus of a probe type but also to an apparatus of a scanning endoscope type.

In each of the above described first to third examples and seventh example, each of the first and second lens groups L1 and L2 is a single lens. In each of the above described fourth and sixth examples, the first lens group L1 is a cemented lens and the second lens group L2 is a single lens. In the above described fifth example, each of the first and second lens groups L1 and L2 is a cemented lens. In another example according to the invention, the scanning objective lens may be configured such that the first lens group L1 is a single lens and the second lens group L2 is a cemented lens.

This application claims priority of Japanese Patent Application No. P2009-172433, filed on Jul. 23, 2009. The entire subject matter of the application is incorporated herein by reference.

What is claimed is:

1. A scanning objective lens for scanning on an observation target with light emitted from an exit end face of an optical fiber moving on a curved plane formed to be convex on an objective lens side, comprising:
a first lens group having a positive power; and
a second lens group having a positive power,
the first lens group and the second lens group being arranged in this order from the optical fiber's exit end face side,
the scanning objective lens satisfying conditions:

$$0.60 < f1/f2 < 1.25 \quad (1);$$

$$0.95 < |R1a/R1b| < 2.50 \quad (2); \text{ and}$$

$$1.25 < R2b/f < 4.80 \quad (3)$$

when f1 (unit: mm) denotes a focal length of the first lens group, f2 (unit: mm) denotes a focal length of the second lens group, R1a (unit: mm) denotes a curvature radius of a lens surface of lens surfaces in the first lens group nearest to the exit end face of the optical fiber, R1b (unit: mm) denotes a curvature radius of a lens surface of the lens surfaces in the first lens group nearest to the observation target, wherein a lens surface of lens surfaces in the second lens group nearest to the observation target is a concave surface,
and where R2b (unit: mm) denotes a curvature radius of the concave surface, and f (unit: mm) denotes a total focal length of the scanning objective lens.

2. The scanning objective lens according to claim 1, wherein:
the first lens group is a cemented lens in which a first negative lens and a first positive lens arranged in this order from the optical fiber's exit end face side are cemented together; and
the scanning objective lens satisfies conditions:

$$0.35 < d11/d1 < 0.60 \quad (4); \text{ and}$$

$$20 < v12 - v11 \quad (5)$$

where d1 (unit: mm) denotes a thickness of the first lens group on an optical axis, d11 (unit: mm) denotes a thickness of the first negative lens on the optical axis, v11 denotes Abbe number with respect to e-line of the first negative lens, and v12 denotes Abbe number with respect to e-line of the first positive lens.

3. The scanning objective lens according to claim 1, wherein the first lens group is a single lens.

4. The scanning objective lens according to claim 1, wherein:
the second lens group is a cemented lens configured such that a second positive lens and a second negative lens arranged in this order from the optical fiber's exit end face side are cemented together; and
the scanning objective lens satisfies a condition:

$$v22 < 25 \quad (6)$$

where v22 denotes Abbe number of the second negative lens with respect to e-line.

5. The scanning objective lens according to claim 1, wherein the second lens group is a single lens.

6. The scanning objective lens according to claim 1, further comprising a third lens group arranged on a rear side of the second lens group, the third lens group having a negative power.

7. A scanning probe, comprising:
an optical fiber which transmits light emitted from a light source;
an oscillating unit configured to cause the optical fiber to oscillate so that an exit end face of the optical fiber periodically moves along a predetermined track on a curved plane;
a scanning objective lens according to claim 1; and
a light output unit configured to receive light reflected from the observation target.

8. A scanning endoscope, comprising:
an optical fiber which transmits light emitted from a light source;
an oscillating unit configured to cause the optical fiber to oscillate so that an exit end face of the optical fiber periodically moves along a predetermined track on a curved plane;
a scanning objective lens according to claim 1; and
a light output unit configured to receive light reflected from the observation target.

* * * * *